Aug. 19, 1969  A. G. BODINE  3,461,970
SONIC METHOD AND APPARATUS FOR BREAKING CRUSTS
ON AGRICULTURAL SOIL
Filed Sept. 13, 1966  2 Sheets-Sheet 1

ALBERT G. BODINE
INVENTOR.

BY
ATTORNEY

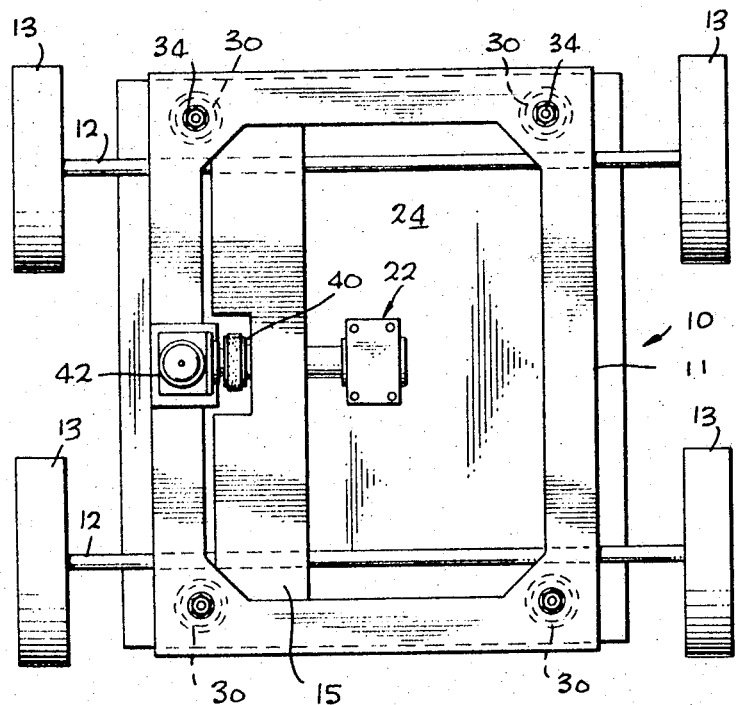
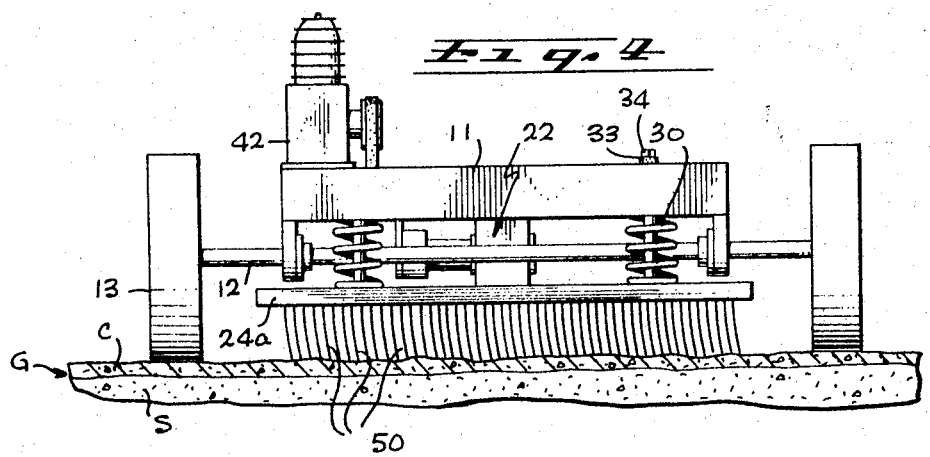

United States Patent Office 3,461,970
Patented Aug. 19, 1969

3,461,970
SONIC METHOD AND APPARATUS FOR BREAKING CRUSTS ON AGRICULTURAL SOIL
Albert G. Bodine, Los Angeles, Calif.
(7877 Woodley Ave., Van Nuys, Calif. 91406)
Filed Sept. 13, 1966, Ser. No. 579,120
Int. Cl. A01b 79/00, 35/32
U.S. Cl. 172—1                           11 Claims

ABSTRACT OF THE DISCLOSURE

A device and method for breaking up a soil crust comprised of an elastically vibrated resonator plate disposed spatially above and generally parallel to the crust, the plate being vibrated by an orbiting mass oscillator so as to establish a resonant standing wave pattern in the plate with the sonic energy transmitted from the plate through intervening air to the crust, causing the desired result.

---

This invention is concerned with sonic methods and apparatus for use in agriculture to treat and break the crust that tends to form on the top of agricultural soil owing to sun baking following a rain. Such a crust, typically from one-half to one inch thick, is found on the top of some agricultural soils following a rain, and then a period of baking in the sun. This hard crust very greatly hinders the ability of a seedling shoot to break through the surface.

The condition referred to is very bad, patricularly with many crops such as lettuce or cotton where hindering of the seedling shoot coming through late can very greatly delay the time of harvesting of the crop. In cotton planting, the farmer occasionally plants extra seed so as to have more shoots in a cluster, with the intent that the cluster may collectively develop sufficient strength to break through the soil crust. These extra shoots then require thinning labor.

The primary object of the present invention is to treat and break up this crust by applying a high-energy sonic field thereto. One preferred form of my invention employs air coupling, with a sonic output transducer transported along and directly above the surface of the ground, so as to transmit acoustic energy to the crust. This air coupling transducer can comprise a vibrating diaphragm broadly in the nature of a loudspeaker, which is transported along, parallel to the crust. The sonic energy is delivered from this transducer through the intervening air column and down to and through the crust itself. The crust is a very good receiver of sonic energy under these conditions, because the transducer diaphragm can be of a large downwardly directed frontal area, affording it excellent acoustic coupling to the crust. The sonically energized crust is, by this process, set into sonic vibration, with a fairly substantial amplitude of vibration, and because of its inherent brittleness, is rapidly fragmented. Large concentration of sonic energy at and within the crust is also greatly aided by the fact that the crust comprises a discrete layer having a discrete acoustic impedance, which has a magnitude very different from that of the soft or uncrusted soil immediately below, with the consequence that the interface between the crust and the soil below tends to reflect upwardly the sonic energy received within the crust and which might otherwise be transmitted on down, and so that the sonic energy is thereby concentrated within the crust while the soil below is somewhat isolated.

In one special practice of the invention, I adjust the resonat vibration frequency of the transducer in relation to the natural vibration frequency of the crust itself, and thus establish a strong resonant condition in the vibrating crust so that sonic energy is thereby concentrated or increased in denstiy within the crust. Such concentration of energy within the crust of course increases the vibratory amplitude of the crust, and accelerates its breakup.

One form of apparatus in accordance with the invention comprises a wheeled vehicle with a large horizontally disposed transducer diaphragm in the form of a steel, elastically vibratory plate mounted thereon, with the wheels located close to the plate so that the distance of the plate above he ground surface is controlled fairly accurately. The transducer plate functions as a combined resonator and sonic wave radiator. It is set into resonant vibration as the vehicle is towed along the ground, so as to apply sonic energy to the crust under controlled conditions. An advantageous special practice of the invention is to locate the transducer a predetermined distance above the ground level, and to correlate the vibratory frequency in relation to this spacing distance, so as to set up a good strong resonant standing wave pattern in the air column between the transducer and the ground. Normally, this air column will be of a length equal to a half-wavelength distance, or multiple thereof, of a sound wave in the air at the vibration frequency of the transducer. Force antinodes are produced at both the transducer and at the ground surface, gving maximized vibration force amplitude at the top of the crust.

An important feature of the invention is that by applying sonic energy to the crust through an air coupling, it is unnecessary to directly apply soil-breaking energy or tillage to the soil by solid coupling, with consequent damage to the very tender seedlings and shoots being formed immediately under the crust. One variant of the invention which can be practiced without such damage, however, employs as a coupling means a soft brush having long, flexible bristles through which the sound wave energy can be transmitted from the transducer to the upper surface of the crust, so that the sonic energy is transmitted to and concentraed a the upper surface of the crust, and thereby sets the crust into vibration, still without likelihood of damage of the shoots which may be trying to work upwards into the crust.

The invention utilizes, as a sonic vibration generator, or oscillator, for setting up a pattern of resonant standing wave vibration in the transducer plate (which is, acoustically, a combined resonator and wave radiator), a certain orbital-mass type of mechanical vibrator which has certain highly advantageous characteristics, particularly as regards accommodation automatically to variations in the impedance of the soil crust being worked, both from moment to moment during breaking up of the crust, and from point to point over the agricultural area being treated. The combination of such a generator with a resonant elastically vibratory transducer, positioned to transmit energy downward to the soil crust, is accordingly a broad and important feature of the invention.

The so-called "orbital-mass" vibration generator may take any of various mechanical forms, one of the simplest and best of which involves a roller mass rolling around in a bearing, so that the mass generates a centrifugal force which is reactively opposed by the bearing. The bearing is on a support frame or housing, which in response to the centrifugal force so generated and applied, exerts a periodic inertial force on whatever may support it or be coupled thereto. Some suitable improved forms of orbital-mass generator or oscillator are disclosed in my Patents Nos. 2,960,314 and 3,217,551. The details of these generators will therefore not be considered, beyond to note that the orbital mass may be driven in various ways, such as by an electrical motor, for example an induction motor, which has a useful inverse speed responsiveness to load. Or, when a greater inverse speed responsiveness to load is desired, by a series motor, or by an internal combustion engine. In other cases, as in the case of an orbiting roller, the drive may be by an air or other fluid jet directed against the roller, which has the desired inverse speed responsiveness to load by "slipping" in the air stream.

Such an orbital-mass vibration generator may be mounted, for example, in the central area of the elastically vibratory transducer plate of the invention. In such case, the orientation may be such that the orbital mass has its orbital path about a horizontal axis, i.e. about an axis parallel to the transducer plate. The housing of the generator being coupled to the center of the plate, a continuously rotating force vector set up in the housing by the orbital mass, as aforesaid, is applied from the housing of the generator to the plate. The useful component of this rotating force vector is a cyclic force oriented on a direction line perpendicular to the plate, and the orbital mass is driven at the resonant standing wave frequency of the plate for a two-dimensional vibratory bending mode, of equivalent full wavelength in each direction. The plate thus has velocity antinodal regions in this central area and about its periphery, and a nodal region therebetween. The two antinodal regions are of course regions of large vibration amplitude in a direction normal to the plate, while the nodal region is a region of minimized vibration amplitude, as will be readily understood by those skilled in the acoustics art. The transducer plate is thus vibrated at its resonant frequency, and functions as a resonator directly coupled with the oscillator or vibration generator. This resonator then radiates sonic waves in a downward direction to the earth crust to be broken, and is thus sonically coupled to the latter, which constitutes a work load on the system. The earth crust is thereby set into vibration; and as mentioned heretofore, the system can readily be adjusted or built to radiate sound waves at or near to a resonant frequency of the earth crust, so that the earth crust is not only vibrated, but set into resonantly magnified vibration. Because of the large frontal area of the plate and its proximity to the earth crust, a close sonic coupling is thereby achieved, and it can be considered that the oscillator, resonator or transducer plate, and the earth crust underneath the latter, constitute an acoustic circuit of which the crust comprises a load having an impedance. In this connection, impedance is to be understood as the ratio of vibratory sonic pressure applied to the crust to the amplitude of vibration thereby imparted to the crust. This impedance has both reactance and resistance components. The reactance component involves both mass and elasticity parameters, and the resistance component is the internal resistance or friction in the soil during its vibration and breakdown. The over-all impedance of the system, and the phase angle, power factor, and frequency for peak resonance, depend upon the magnitudes of these parameters at any given instant, and can vary from instant to instant as the breaking process proceeds, as well as from point to point over the agricultural field as these parameters vary in relation to one another. The orbital-mass type of vibration generator accommodates automatically to these variations in impedance, including change of phase angle of its orbiting mass relative to the vibrating plate, with accompanying change of power factor, and/or frequency, assuring thereby effective and sustained delivery of large sonic energy to the crust, such as causes it rapidly to disintegrate owing to large amplitude vibration thereof.

Such an orbital-mass oscillator as discussed above automatically adjust its output frequency to maintain resonance with changes in the impedance of the circuit. Thus, in the face of changes in the effective mass and compliance presented by the load, the system automatically maintains itself in optimum resonant operation by virtue of a resonant frequency "lock-in" characteristic of the orbiting-mass generator. In this connection, the orbiting-mass oscillator can be dimensioned to have a tendency, when not improperly overdriven, as described elsewhere herein, to lock in at a frequency just on the low side of that for peak resonance. Such orbiting-mass oscillator then automatically changes its frequency and also its phase angle and therefore its power factor to correspond with changes in the resistive and reactive components of load impedance in the output portion of the acoustic circuit, which will be seen to be the earth crust, and it will be further seen that changes in impedance in this crust result in changes in the resonant frequency of the over-all acoustic circuit which includes the sonically intercoupled oscillator, resonator plate and crust. And as explained, the orbital-mass oscillator accommodates, by change in frequency, phase angle and power factor to these changes in impedances as they affect the resonant frequency of the circuit. At the same time, assuming a drive powered to establish operation in the range of resonance, and just below the frequency for peak resonance, and assuming also a drive that has the characteristic of inverse speed responsiveness to load, as against a "brute force" overly powered prime mover, the drive effort can easily be adjusted so that the system locks in at just below the resonant frequency of the circuit, inclusive of the earth-crust load.

Some further consideration should be given to the transducer plate acting in the acoustic circuit as a mechanical resonator. Such an orbital-mass oscillator as described above, coupled to a resonator, e.g., the above mentioned vibratory transducer plate, with the latter sonically coupled to a "load," i.e. the earth crust, can be set up very simply and advantageously to afford a very powerful vibratory system that is inexpensive, reliable, and avoids the complications of electronic-type transducers. Such a system can be readily designed with sufficient elastic compliance reactance to counteract the mass reactance of the system at the resonant operating frequency, and thus virtually cancel out force-wasting mass blocking effects. It is a further definite advantage that the elastic compliance reactance in such a system can readily be made sufficiently large to afford resonant magnification of vibratory amplitudes in the system, and a large energy storage property (often designated as "Q"). The system also has a surprising frequency stabilizing feedback effect from the resonator to the oscillator, provided, in accordance with the invention, the oscillator be designed to deliver a cyclic impulse properly related to the reactance and resistance of the resonator plate and of the load, so that the oscillator and resonator tend to maintain a frequency just below peak resonance, as explained above, and provided further that I drive the oscillator of this combination with a characteristic of inverse speed responsiveness to load. The oscillator then both locks in at such frequency, and automatically adjusts its phase angle to the load resistance. The frequency also adjusts to the load reactance. An ideal acoustic system for transmitting large sonic energy downwardly into the earth crust is thus provided.

SONIC DISCUSSION

By the expression "sonic vibration" I mean elastic vibrations, i.e. cyclic elastic deformations, such as longitudinal, lateral, gyratory, torsional, etc., generated in a structure, or which travel through a medium with a characteristic velocity of propagation. There can be such elastically vibratory systems wherein the essential features of mass appear as a localized influence or parameter, known as a "lumped constant," and another such lumped constant can be a localized or concentrated elastically deformable element, affording a local effect referred to variously as elasticity, modulus, modulus of elasticity, stiffness, stiffness modulus, or compliance, which is the reciprocal of the stiffness modulus. These constants, when functioning in an elastically vibratory system such as mine, have cooperating and mutual influencing effects like equivalent factors in alternating-current electrical systems. In fact, in both distributed and lumped constant systems, mass is mathematically equivalent to inductance (a coil); elastic compliance is mathematically equivalent to capacitance (a condensor); and friction or other pure energy dissipation is mathematically equivalent to resistance (a resistor).

In this invention impedance is important to the accomplishment of desired ends, and is important to consider if optimized energization of a system is desired. If the impedances are adjusted to be matched somewhat, energy transmission is made very effective.

Impedance, in an elastically vibratory system, is, mathematically, the complex quotient of applied alternating force and linear velocity. It is analogous to electrical impedance. The concise mathematical expression for this impedance is $$Z = R + \sqrt{-1}\left(2\pi fM - \frac{1}{2\pi fC}\right)$$

where M is vibratory mass, C is elastic compliance (the reciprocal of stiffness, or of modulus of elasticity) and $f$ is the vibration frequency.

Resistance is the "real" part R of the impedance, and represents energy dissipation, as by friction.

Reactance is the "imaginary" part of the impedance, and is the difference of mass reactance and compliance reactance.

Mass reactance is the positive imaginary part of the impedance, given by $2\pi fM$. It is analogous to electrical inductive reactance, just as mass is analogous to inductance.

Elastic compliance reactance is the negative imaginary part of impedance, given by $1/2\pi fC$. Elastic compliance reactance is analogous to electrical capacitative reactance, just as compliance is analogous to capacitance.

Resonance in the vibratory circuit is obtained at the operating frequency at which the reactance (the algebraic sum of mass and compliance reactances) becomes or approaches zero. Vibration amplitude is limited under this condition to resistance alone, and is maximized. The inertia of the mass elements necessary to be vibrated does not under this condition consume any of the driving force. Moreover, the mass elements are very often beneficial, contributing to the acoustic "Q" of the system.

A valuable feature of my sonic circuit is the provision of enough extra elastic compliance reactance so that the mass or inertia of various necessary bodies in the system does not cause the system to depart so far from resonance that a large proportion of the driving force is consumed and wasted in vibrating this mass. For example, a mechanical oscillator or vibration generator of the type normally used in my inventions always has a body, or carrying structure, for containing the cyclic force generating means. This supporting structure, even when minimal, still has mass, or inertia. This inertia could be a fordce-wasting detriment, acting as a blocking impedance using up part of the periodic force output just to accelerate and decelerate this supporting structure. However, by use of elastically vibratory structure in the system, the effect of this mass, or the mass reactance resulting therefrom, is counteracted at the frequency for resonance; and when a resonant acoustic circuit is thus used, with adequate capacitance (elastic compliance reactance), these blocking impedances are tuned out of existence, at resonance, and the periodic force generating means can thus deliver its full impulse to the "work," which is the resistive component of the impedance.

Sometimes it is especially beneficial to couple the sonic oscillator at a low-impedance (high velocity vibration) region, for optimum power input, and then have high impedance (high force vibration) at the work point. The sonic circuit is then functioning additionally as a transformer, or acoustic lever, to optimize the effectiveness of both the oscillator region and the work delivering region.

The optimal form of my invention employs, as the source of sonic power, a sonic resonant system comprising an elastic member in combination with an orbiting-mass oscillator or vibration generator. This combination has many unique and desirable features. For example, this orbiting-mass oscillator has the ability to adjust its input power and phase to the resonant system so as to accommodate changes in the work load, including changes in either or both the reactive impedance and the resistive impedance. This is a very desirable feature in that the oscillator "hangs on" to the load even as the load changes.

It is important to note that this unique advantage of the orbiting-mass oscillator accrues from the combination thereof with the acoustic resonant circuit, so as to comprise a complete acoustic system. In other words, the orbiting-mass oscillator is matched up to the resonant part of its system, and the combined system is matched up to the acoustic load, or the job to be accomplished. One manifestation of this proper matching is a characteristic whereby the orbiting-mass oscillator tends to "lock in" to the resonant frequency of the resonant part of the system.

The combined system has a unique performance which is exhibited in the form of a greater effectiveness and particularly greater persistence in a sustained sonic action as the work process proceeds or goes through phases and changes of conditions. The orbiting-mass oscillator, in this matched-up arrangement, is able to hang on to the load and continue to develop power as the sonic energy absorbing environment changes with the variations in sonic energy absorption by the load. The orbiting-mass oscillator automatically changes its phase angle, and therefore its power factor, with these changes in the resistive impedance of the load.

A further important characteristic which tends to make the orbiting-mass oscillator hang on to the load and continue the development of effective power, is that it also accommodates for changes in the reactive impedance of the acoustic environment while the work process continues. For example, if the load tends to add either inductance or capacitance to the sonic system, then the orbiting-mass oscillator will accommodate accordingly. Very often this is accommodated by an automatic shift in frequency of operation of the orbiting-mass oscillator by virtue of an automatic feedback of torque to the energy source which drives the orbiting-mass oscillator. In other words, if the reactive impedance of the load changes this automatically causes a shift in the resonant response of the resonant circuit portion of the complete sonic system. This in turn causes a shift in the frequency of the orbiting-mass oscillator for a given torque load provided by the power source which drives the orbiting-mass oscillator.

All of the above mentioned characteristics of the orbiting-mass oscillator are provided to a unique degree by this oscillator in combination with the resonant circuit. The kinds of acoustic environment presented to the sonic source by this invention are uniquely accommodated by the combination of the orbiting-mass oscillator and the resonant system. As will be noted, this invention involves the application of sonic power which brings forth some special problems unique to this invention, which problems are primarily a matter of delivering effective sonic energy to the particular work process involved in this invention. The work process, as explained elsewhere herein, presents a special combination of resistive and reactive impedances. These circuit values must be properly met in order that the invention be practiced effectively.

Reference is now directed to the accompanying drawings showing certain selected illustrative embodiments of the invention, and wherein:

FIG. 4 is an end elevational view of a modified form of the invention; and

FIG. 5 is a diagrammatic view showing the transducer plate in medial transverse section, and showing also, in broken lines, the outline of a representative mode of standing wave vibration induced in this transducer plate.

Figure 1:
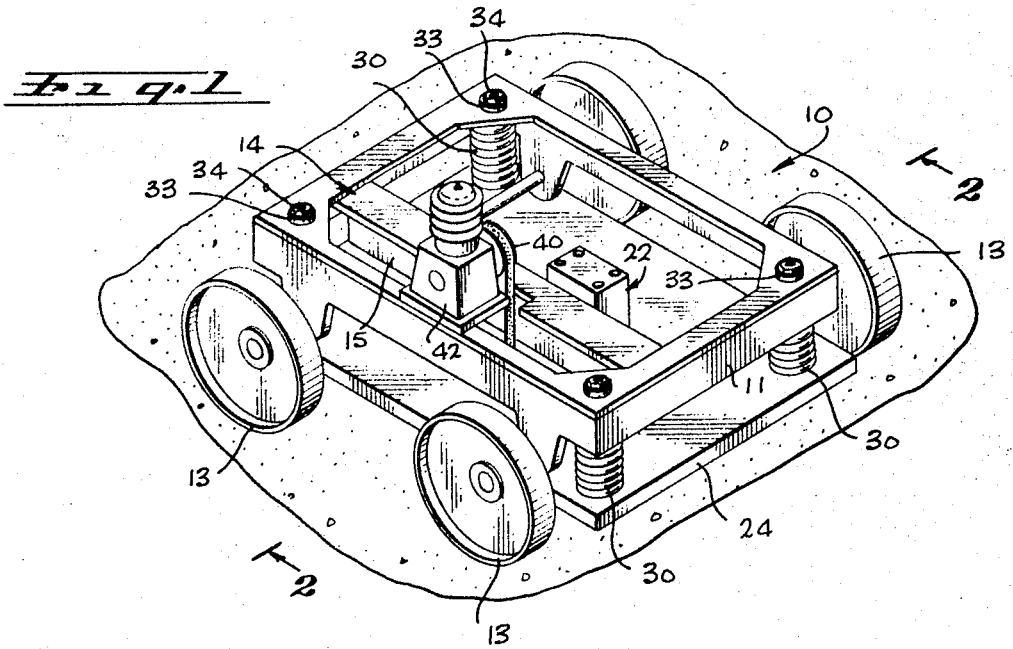
FIG. 1 is a perspective view of a wheeled vehicle carrying a sonic wave generating and radiating system in accordance with the invention.
Figure 2:
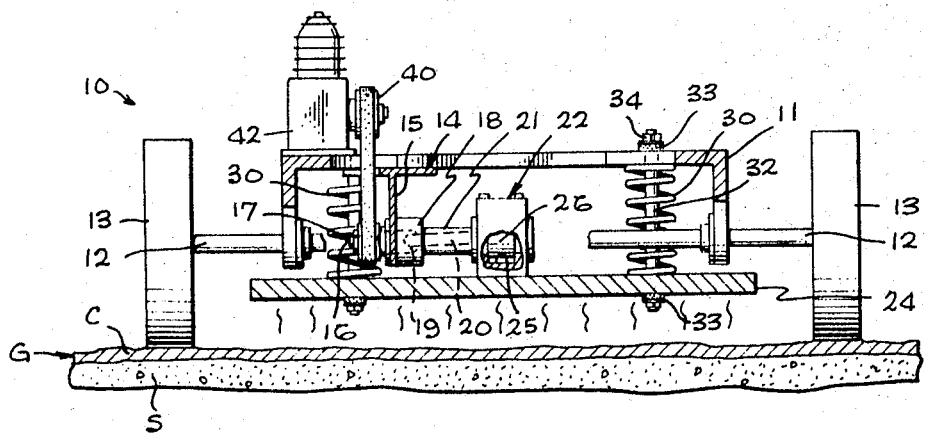
FIG. 2 is a transverse section taken on line 2—2 of FIG. 1.
Figure 3:
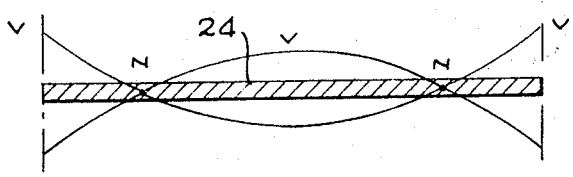
FIG. 3 is a plan view of the system of FIG. 1.

Referring now to these drawings, the numeral 10 designates generally a relatively low vehicle having a low platform frame 11 mounting axles 12 with wheels 13. A longitudinal member 14 of the frame 11 has a depending flange 15 which mounts a bearing for a shaft 16 carrying a belt pulley 17. The shaft 16 projects through flange 15 into a housing 18, also mounted on flange 15, for a universal joint represented at 19, and drives through said universal joint a conically gyratory shaft 20, which is to be understood as driving the presently mentioned orbital-mass rotor. The shaft is shown as contained within a suitable tubular housing 21 which leads to and has a loose fit with the case of an orbital-mass vibration generator or oscillator 22 (FIG. 1 of my Patent No. 3,217,-551) mounted preferably at the center of horizontally disposed transducer plate 24.

The oscillator 22 may be illustratively of the type which is shown in FIG. 1 of my Patent No. 3,217,551, and the details thereof therefore need not be disclosed herein. For the purpose of a more complete disclosure, said patent is incorporated herein by this reference. As diagrammatically shown, however, the case of oscillator 22 contains a cylindrical bearing or raceway 25 for a cylindrical orbiting-mass rotor or roller 26, of somewhat less diameter than that of the bearing or raceway 25. The roller mass 26 is thus adapted to roll about the bearing surface of the raceway 25, moving in an orbital path. It is driven in rotation through a suitable coupling connection from the gyratory shaft 20 (see Patent No. 3,217,-551). The centrifugal force developed by this rotor is exerted against the case of the oscillator, and thence to the center of the relatively massive, substantially horizontally disposed transducer plate 24 to which the case is firmly secured. Thus, a rotating force vector, turning about the horizontal axis of the cylindrical raceway 25, is exerted as a reactive or inertial force against the center of the plate 24. The latter, which may be substantially square, and is composed of elastic material, preferably steel, is here shown as hung from frame 11 by four relatively soft coil springs 30. Threaded rods 32 extend axially through the springs 30, and pass through holes in the plate 24 and the frame 11. On these rods, above the frame 11 and below the plate 24, are resilient rubber blocks 33, and nuts 34 are threaded on the ends of rods 32, being screwed down until a snug assembly is provided. The springs 30 are preferably located sufficiently inwardly of the perimeter of the plate 24 to be in or near the nodal region of the standing wave set up in said plate. If they are not exactly at the nodes, the springs 30 and rubber blocks 33 will accommodate any vibratory motion.

The aforementioned pulley 17 on drive shaft 16 is belt-connected to a pulley 40 driven by an internal combustion engine 42 mounted on frame 11.

The wheels 13 of the vehicle are shown as rolling over the ground, generally represented at G, the top layer of the soil of which is shown to comprise a baked or hardened crust C, of a typical thickness of one-half inch to one inch, below which is the normal soil S.

Assume now that a crust such as C has formed on the soil, and it is desired to break this crust by the system of the present invention. The vehicle 10 is moved progressively over the field, and for this purpose, it may either be towed, or provided with a self-propulsion power plant such, for example, as found in common use on power mowers. The engine 20 is driven, and its throttle opened until the vibration generator 22 operates at the resonant frequency of the transducer plate 24 for a standing wave pattern of elastic vibration. As here shown, and as diagrammed in FIG. 5, the standing wave pattern is substantially one full wavelength long in both directions, i.e. both longitudinally and transversely of the plate. As represented in FIG. 5, the standing wave is characterized, in any medial transverse section, by velocity antinodal regions V in the central area of the plate and around the periphery, with intervening relatively stationary nodal regions N. It will be appreciated that the standing wave pattern as seen in FIG. 5 is substantially the same in the plane at right angles to that shown in said diagram. It will be seen that the pattern of standing wave vibration here referred to takes place in vertical planes; and it may have been noted that the orbital-mass generator has a component of output force in a horizontal plane in addition to its vertical component of force that sets up the described standing wave pattern. This horizontal output force is not at any resonant frequency of the system, and therefore produces no large amplitude horizontal vibration. It is one of the virtues of the orbital-mass oscillator that large vibration amplitude can be set up in the desired direction, i.e. transversely of the horizontally disposed plate, by "unblocking" the impedance of that plate to vibration in the desired direction. This is accomplished by making the plate of such mass and elastic compliance that, when these parameters are combined with the mass of the oscillator housing, the oscillator and resonator combination is then resonant to vibrations in the said direction at a particular frequency, and by providing an orbital-mass generator that is operable in the range of that frequency.

The transducer or resonator plate 24 thus is set into resonant standing wave vibration in vertical planes, by the orbital-mass oscillator 22 driven at the resonant frequency of the plate by proper setting of the throttle for the engine 42. Actually, it is very highly advantageous and the best practice of the invention, for reasons mentioned hereinabove, that the throttle setting of the engine be made such that the vibration frequency set up in the plate 24, under operating conditions, i.e., with sonic coupling to the earth crust C, be just under that for the peak of resonance of the system. Operating in this manner, the system inherently tends toward frequency stability, with only such frequency deviations as arise out of load reactance changes as the work proceeds.

The soil C, thus sonically coupled into the vibratory system, is set into vibration, and thereby caused to progressively fracture and crumble. As explained hereinabove, the acoustically coupled-in crust absorbs a large amount of sonic energy, and can be set into strong sonic vibration. It is linked to the vibratory resonator and wave radiator plate as definitely as though there were mechanical linkages therebetween; and accordingly, the resonator plate and orbital-mass oscillator are subject to back-reaction from the vibrating crust as the impedance of the crust varies with progressive treatment and crumbling thereof, as well as with different conditions of the crust in different parts of the agricultural field. As also mentioned hereinabove, one preferred practice of the invention is to correlate the orbital-mass generator, the resonator plate, and the crust to be treated, in such a way that the crust is vibrated at its own resonance frequency, thus maximizing the vibration amplitude of the crust, as well as its speed of disintegration. It will of course be evident that the crust, or a vibratory area thereof, will have its own natural period of vibration, or, often in practice, a relatively definite range or band of frequencies within which it is somewhat near the frequency for peak resonance. Accordingly, the resonator plate and the orbital-mass oscillator are then designed to provide an over-all system which is operable at a frequency in the range of resonance for both the vibratory transducer plate and the crust.

Still further, another advantageous practice of the invention is to assure strong-vibratory action at the crust, or at its top surface, by correlating the frequency of vibration with the vertical air spacing between the plate and the crust so that a longitudinal standing wave is set up in the air space between the lower face of the transducer plate and the upper face of the crust. This longitudinal standing wave can advantageously be of a length to a half-wavelength of a longitudinal standing wave, or multiple thereof, in air, for the frequency of operation of the system. A velocity antinodal condition is thereby established at the upper surface of the crust, leading to maximum vibration amplitude.

It has been explained that the conditions of the crust vary as the crust is progressively disintegrated, and also vary from point to point over the surface of the agricultural field. It has been further described how this results in variation in the impedance of the crust, and there has been a description of how the system of the invention accommodates to these impedance changes so as to assure a satisfactory and rapid breakup of the crust in the course of the process. It may be desirable to summarize this last matter at this point in the specification. Accordingly, if the "load" on the orbital-mass oscillator-resonator combination (the load being understood to be the acoustically coupled-in earth crust) should vary in impedance, either mass reactance, or elastic compliance reactance, during treatment, the frequency and phase angle of the oscillator as well as power factor shift to accommodate these changes. Such changes in reactance thus result in changes in impedance, phase angle, and resonance frequency. If the prime mover is one which is inversely speed responsive to torque, there is a resulting automatic feedback of torque to the prime mover (in the illustrative embodiment, an internal combustion engine of the usual type, which has this inverse speed responsiveness to torque) such as to re-establish stable operation of the oscillator at a new resonance frequency of the system, and with adjusted phase angle and power factor which automatically accommodate the changed reactance and the energy consuming load. Any changes in magnitude of either or both the friction or energy consuming part of the load and the reactive part of the load are thus automatically accommodated by the orbital-mass oscillator so that the latter sustains its development and transmission of power into the load, which is the earth crust being broken, throughout all such changes.

It has been pointed out that an advantage and an especial characteristic of the invention is that there is no mechanical coupling between the resonator plate 24 and the earth crust C sonically coupled thereto through the air, with the advantage that there is no disturbance of or damage to any tender seedlings or shoots immediately under the crust in FIG. 4 is shown a variant of my invention wherein the system is entirely the same as in the earlier described figures, with the exception that a multiplicity of bristles 50 mounted onto the lower side of the transducer plate, designated in this instance by reference numeral 24a, are utilized as a sonic transmission means from the plate 24a to the crust C. These bristles 50 can be somewhat flexible and resilient wires which, acting together, transmit vibratory motion from the transducer plate to the crust, and thus serve to sonically, but mechanically, couple the sonically vibratory resonator plate 24a to the crust C. It will be seen that this is done without the crust being gouged or broken by the coupling bristles 50, and thus entirely without danger to seedlings or shoots underneath the crust. The crust is thereby set into sonic vibration, as before, and it will be understood that the balance of the wheeled sonic machine and its mode of operation, are identical to what was previously illustrated in and described in connection with FIGS. 1–3 and 5. No further description of the machine of FIG. 4 should therefore be necessary.

It will of course also be understood that the embodiments here chosen for illustration are not exhaustive of all of the various physical forms in which the invention may be carried out in practice, and that numerous changes in design, structure, and arrangement may be made.

I claim:
1. In a machine for breaking up a soil crust on an agricultural field, the combination of:
   a vehicle adapted for transportation along the surface of said field;
   a sonically vibratory, resonant wave-radiator diaphragm mounted on said vehicle and directed downwardly toward said soil crust in acoustically coupled and spatial relation thereto, whereby sonic energy can be transmitted to and into said soil crust, and said soil crust thereby set into vibration;
   a sonic vibration generator carried by said vehicle;
   means sonically coupling said generator to said diaphragm; and
   means for driving said generator at a frequency in the range of resonance of said radiator diaphragm and establishing a standing wave pattern in said diaphragm.
2. In a machine for breaking up a soil crust on an agricultural field, the combination of:
   a vehicle adapted for transportation along the surface of said field;
   an elastically vibratory resonator plate mounted on said vehicle in a plane generally spatially parallel to the surface of the field over which said vehicle is transported, said plate being vibratory on said vehicle in vertical planes in a resonant standing wave pattern characterized by nodal and antinodal regions established in said plate, and being sonically coupled to the soil crust therebelow;
   an orbital-mass oscillator coupled to said resonator plate in an antinodal region thereof; and
   power means coupled to and driving said orbital-mass oscillator at a frequency in the range of resonance of the acoustic circuit comprised of said oscillator, said resonator plate and the portion of said soil crust coupled through an air space to and vibrating with said resonator plate.
3. The subject matter of claim 2, wherein said power means is one having the characteristic of inverse speed responsiveness to load.
4. The subject matter of claim 3, wherein said power means is adjusted to drive said orbital-mass generator at a frequency in the range of resonance but on the low side of the frequency for peak resonance of said acoustic circuit.
5. The subject matter of claim 2, wherein said vehicle has wheels and a frame supported thereby;
   spring support means guidingly supporting said resonator plate from said frame;
   said power means comprising an internal combustion engine mounted on said frame;
   said orbital-mass oscillator being mounted on said plate; and
   a flexible power transmission means between said power means on said frame and said oscillator on said resonator plate.
6. The subject matter of claim 2, including a multiplicity of a sonic coupling bristles mounted on the underside of said resonator plate and engaging the surface of said soil crust at their lower ends.
7. The subject matter of claim 2, wherein said prime mover is adjusted to drive said oscillator at a frequency to which said soil crust is resonant.
8. The process of sonically breaking up a soil crust on the surface of an agricultural field, that comprises:
   transporting a vibratory resonator plate over the soil crust at a spacing distance thereabove but in sonic coupling relationship with said crust;
   driving an orbital-mass generator acoustically coupled to said resonator plate at a frequency which is in the range of resonance of said resonator plate for a pattern of elastic standing wave vibration thereof, with a drive effort that is inversely speed responsive to load.

9. The process of claim 8, wherein the drive effort exerted on said vibration generator establishes a range of operating frequencies in the general range of resonance but on the low side of the frequency for peak resonance.

10. The process of claim 8, including the further step of positioning the resonator plate at a distance above the crust equal substantially to any number, including unity, of half-wavelength distances of a sound wave in air for the operating frequency of the process.

11. The subject matter of claim 9, wherein the orbital-mass generator is driven at substantially a resonant frequency of the soil crust.

References Cited

UNITED STATES PATENTS

| 2,897,734 | 8/1959 | Bodine | 94—48 XR |
| 3,166,772 | 1/1965 | Bodine | 74—87 |

ANTONIO F. GUIDA, Primary Examiner

J. W. PETERSON, Assistant Examiner

U.S. Cl. X.R.

172—40